United States Patent [19]

Oestreich

[11] 4,330,173
[45] May 18, 1982

[54] CONDUCTOR FOR OPTICAL CABLES

[75] Inventor: Ulrich Oestreich, Munich, Fed. Rep. of Germany

[73] Assignee: Siemens Aktiengesellschaft, Munich, Fed. Rep. of Germany

[21] Appl. No.: 68,883

[22] Filed: Aug. 23, 1979

Related U.S. Application Data

[63] Continuation of Ser. No. 669,107, Mar. 22, 1976, abandoned.

[51] Int. Cl.² .............................................. G02B 5/14
[52] U.S. Cl. .............................................. 350/96.23
[58] Field of Search ...................... 350/96.23

[56] References Cited

U.S. PATENT DOCUMENTS

| | | | |
|---|---|---|---|
| 3,699,950 | 10/1972 | Humphrey, Jr. et al. | 350/96.23 |
| 3,798,099 | 3/1974 | Marcatili | 350/96.23 |
| 3,887,265 | 6/1975 | Margolis et al. | 350/96.23 |
| 3,955,878 | 5/1976 | Nowak | 350/96.23 |
| 4,000,936 | 1/1977 | Gloge | 350/96.23 |
| 4,089,585 | 5/1978 | Slaughter et al. | 350/96.23 |
| 4,153,332 | 5/1979 | Longoni | 350/96.23 |

Primary Examiner—Rolf G. Hille
Attorney, Agent, or Firm—Kenyon & Kenyon

[57] ABSTRACT

An improved conductor for optical cables in which the protective casing for each individual transmission element or fiber optic comprises a double layer protective casing placed on the fiber or fiber bundle with a spacing, said casing having an inner layer of polystyrene and outer layer of polyamide or another plastic material with similar properties.

3 Claims, 2 Drawing Figures

CONDUCTOR FOR OPTICAL CABLES

This is a continuation of application Ser. No. 669,107, filed Mar. 22, 1976, now abandoned.

BACKGROUND OF THE INVENTION

This invention relates to optical transmission elements and cables in general and more particularly to an improved protective casing for optical fibers and optical cables.

Recently cables have been developed for the transmission of light waves using fiber optics. These cables, referred to as optical cables, are used for the transmission of control pulses or may be used in the field of communications engineering, i.e. in telephone systems, etc. The main component of the optical cables are the glass fibers or fiber optics which serve to guide the light beams. When designing optical cables, the mechanical properties of the glass fibers must be taken into consideration. In other words, the glass fibers must be protected, particularly from mechanical stresses as compression, tension and flexural stresses.

Optical conductors are known in which the transmission element itself, i.e. the glass fiber or fiber bundle, is surrounded directly by a covering of plastic. To a certain degree such a covering performs a protective function. On the other hand, it gives an increase in the thickness of the optical transmission element with the object of better handling in processing it into a cable. However, such a covering does not provide effective protection of the transmission element with respect to mechanical stresses. For one thing, the material of the protective covering does not give optimum protection against mechanical stresses such as tensile stresses, impact and flexural stresses and furthermore there is a mechanical coupling through the protective covering of the transmission element to the other elements of the cable core.

It is also known in one cable design to protect the optical transmission element against mechanical stresses by arranging the optical transmission elements on a carrier element comprising a central stress relief element having a star-shaped profiled body applied thereon. The profiled body along with an outer covering forms chambers into which the optical transmission elements are arranged. They are secured in place on the profiled body at spacings by means of special tapes. To provide outer protection, the star-shaped carrier element, after being wrapped with a serving material, is surrounded with an aluminum sheath and protective jacket of polyethylene. Through securing of the optical transmission elements onto the carrier element at spacings, a relatively strong mechanical coupling is established between the optical transmission elements and the tension-proof elements of the cable. This design can also cause problems.

Thus, none of these prior art designs is particularly satisfactory. What is needed is a protective arrangement in which the protection of the optical elements is provided through an appropriate design of the protective casings of the optical conductors themselves.

SUMMARY OF THE INVENTION

The present invention provides such a design. Starting with a conductor for optical signals comprising an optical transmission element i.e. a fiber or fiber bundle, for light transmission and a protective casing of plastic material which surrounds the fiber or fiber bundle, the present invention provides that the inside diameter of the protective casing is at least 30% larger than the outside diameter of the fiber and that the protective casing consists of two layers of plastic materials having different mechanical properties which together form a casing which is resistant to mechanical stress. In this design the inner layer of plastic has a lower coefficient of friction with respect to the fiber or the fiber bundle than the outer layer.

The invention is based on the discovery that very different demands, which cannot be met by a single material, are placed on an effective protective casing for optical transmission elements. These requirements are essentially: (1) decoupling of the optical transmission element from external longitudinal frictional forces i.e. a small coefficient of friction of the casing with respect to the optical transmission element, with a loose arrangement of transmission element in the protective casing; and (2) protection against tranversal forces as well as dynamic stresses. This latter requirement calls for a material having a high modulus of elasticity and great toughness. Furthermore, the mechanical properties of the casing must be sufficient to insure safety against buckling in the case of flexural stresses or lengthwise compression. Furthermore, the protective casing should exhibit good stress corrosion behavior in view of chemical influences and should cause as little additional attenuation of the transmitter light wave as possible due to contact with the optical transmission elements.

In order to obtain the solution in accordance with the present invention, it is first of all esssential that the protective casing have an inside diameter which is larger than the outside diameter of the fiber or fiber bundle. Because of such spacing the fiber or fiber bundle is surrounded with a gap. It is particularly advantageous to choose the dimensions such that the inside diameter of protective casing is about two to three times as large as the outside diameter of the fiber or fiber bundle. Furthermore, it is essential that the protective casing be built up from two layers of different plastic materials which have different properties but together form a protective casing with the desired mechanical properties. Polystyrene is a particularly good material for use in the inner layer of the protective casing. It has a large modulus of elasticity while at the same time having a small coefficient of friction with respect to glass fibers. However, a protective casing of polystyrene alone would not be sufficient since this material is not very tough, not very safe with respect to buckling and is not oil and solvent resistant.

The inner layer may also consist of a fluoropolymer, suitable substances are, a copolymerisate of ethylene and tetrafluoroethylene, such as that marketed by DuPont under the name "Tefzell"; a fluorinated ethylene propylene (FEP) along with perfluroalkoxy resin (Teflon PFA sold by DuPont).

A particularly good material for the outer layer is a plastic material such as polyamide, preferably an aromatic polyamide. In addition, polyterephthalate and also polypropylene and polyethylene may be used. These materials can not be used as the sole casing since they have relatively small moduli of elasticity and consequently larger coefficients of friction with respect to the glass fibers.

Depending on the particular application where the fiber is to be used, expansion and contraction of the protective casing of the optical conductor with temperature change may have to be taken into consideration. Generally, the protective casing expands and shrinks more than the optical transmission elements in the form of glass fibers contained therein. Because of the different expansion behavior, the attenuation properties of the optical transmission elements can be adversely affected. In order to preclude such problems, in accordance with a further embodiment of the present invention, the border region between the inner and outer layer has embedded therein high tensile strength fibers of glass or steel. Alternatively, high tensile strength organic fibers can be used. Since these fibers are firmly connected to the protective casing they permit temperature dependent length changes of the protective casing only to the extent that their own length changes. Such a mechanical improvement of the protective casing can be accomplished, for example, through the use of 1 to 4 fibers which are embedded into the casing during an extrusion process and are uniformly distributed in the circumferential direction.

DETAILED DESCRIPTION OF THE PREFERRED EMBODIMENT

Figure 1:
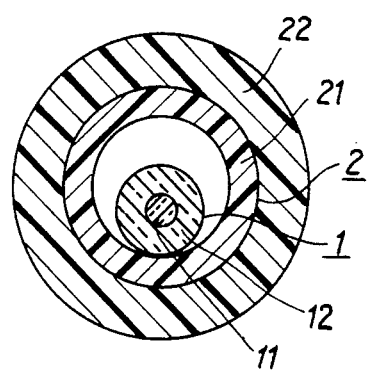
FIG. 1 is a cross-sectional view illustrating a first embodiment of the present invention.

FIG. 1 illustrates a first embodiment of the present invention. Shown is an optical transmission element 1 comprising a glass fiber 11 surrounded by a sheath 12. As is common practice, the core 11 of the fiber has a larger index of refraction than the sheath 12 which has a smaller index of refraction. This tends to maintain the light within the core. Surrounding the optical transmission element 1 is the protective casing 2 of the present invention. As illustrated, it is a two layer casing made up of an inner layer 21 and an outer layer 22. The inner layer 21 may be made, for example, of polystyrene and the outer layer 22 of a aromatic polyamide. Other material such as those noted above having similar characteristics may also be used.

As is evident from FIG. 1, there is a spacing between the optical transmission element 1 and the casing 2. The spacing is provided so that the optical transmission element 1 can execute sufficiently large equalization movements within the protective casing, particularly in the case of flexural stresses. To provide for such, the inside diameter of the protective casing 2 is about 1.5 to 2 times the outside diameter of the transmission element 1.

Figure 2:
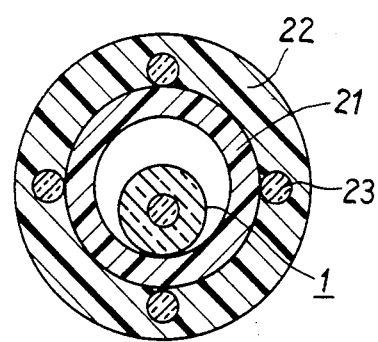
FIG. 2 is a similar view illustrating a second embodiment having high tensile strength fibers.

FIG. 2 illustrates a further embodiment of the present invention. In general, the elements are the same as in FIG. 1. The difference is that, in the border region between the inner layer 21 and the outer layer 22, high tensile strength glass fibers 23 are embedded. As noted above, these are preferably inserted during an extrusion process. The fibers 23 result in a better stability for the outer casing during temperature changes so that the coefficient of expansion of the casing and the transmission element 1, which is made of glass, are more nearly equal.

Thus, an improved optical conductor has been shown. Although specific embodiments have been illustrated and described, it will be obvious to those skilled in the art that various modifications may be made without departing from the spirit of the invention which is intended to be limited solely by the appended claims.

What is claimed is:

1. An improved flexible protective casing for a single longitudinally extending optical fiber for light transmission in an optical cable, comprising an extruded protective casing consisting of two layers of different plastic materials, said protective casing having an inside diameter which is at least 30% larger than the outside diameter of said single fiber, the single fiber being loosely arranged, in air, within said protective casing, said protective casing having:
   (a) an inner layer made of one of the group consisting of polystyrene and a fluropolymer, said layer having a small coefficient of friction with respect to said fiber, and
   (b) an outer layer made of one of the group consisting of a polyamide, polyterephtalate, polypropylene and polyethylene.

2. Apparatus according to claim 1 wherein said outer layer is made of an aromatic polyamide.

3. Apparatus according to claim 1 and further including at least one high tensile strength fiber made of the group consisting of glass, steel and a high tensile strength organic material embedded in the border region between said inner and said outer layer.

* * * * *